Jan. 18, 1955

K. G. ÅHLÉN 2,699,689

VARIABLE SPEED POWER TRANSMISSION

Filed Feb. 20, 1951

INVENTOR.
Karl Gustav Åhlén
BY
his Attorney

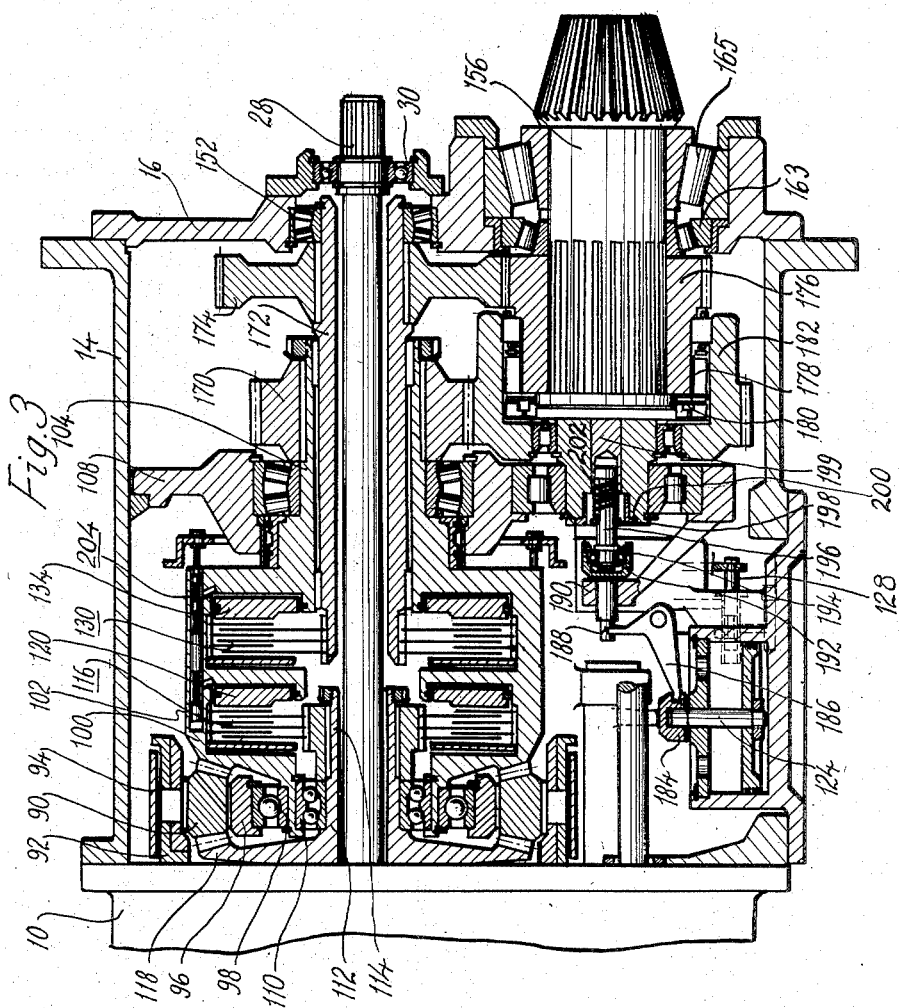

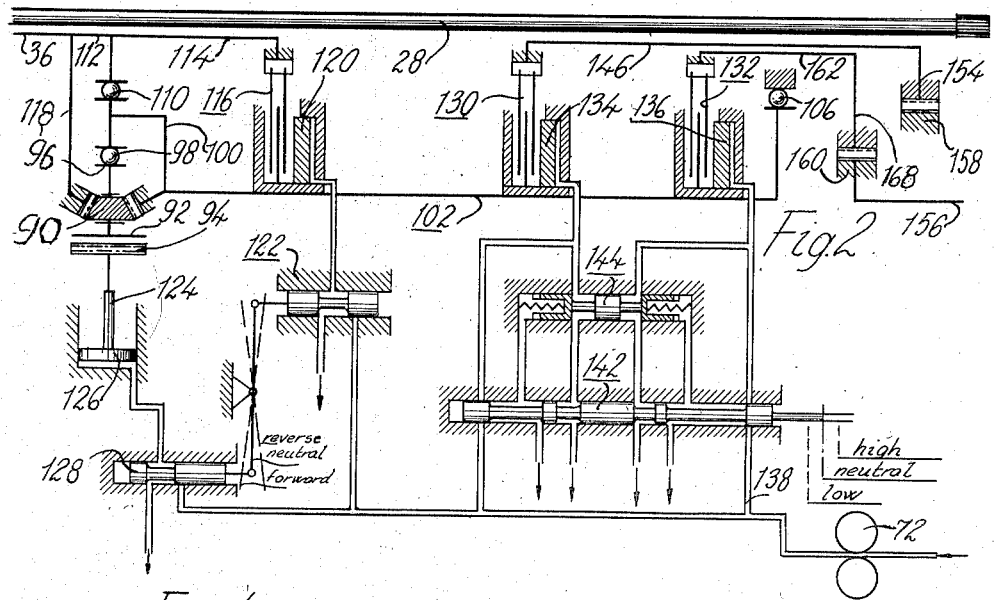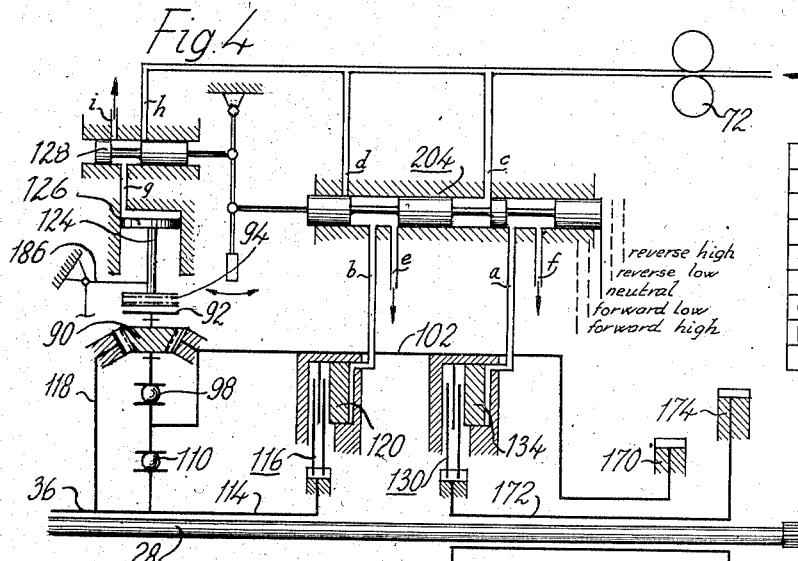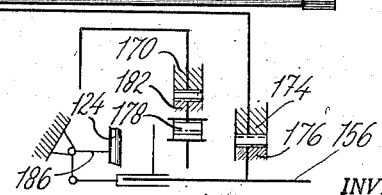

United States Patent Office 2,699,689
Patented Jan. 18, 1955

2,699,689

VARIABLE SPEED POWER TRANSMISSION

Karl Gustav Åhlén, Stockholm, Sweden, assignor, by mesne assignments, to Jarvis C. Marble, New York, N. Y., Leslie M. Merrill, Westfield, N. J., and Percy H. Batten, Racine, Wis., trustees Application February 20, 1951, Serial No. 211,867

Claims priority, application Sweden February 23, 1950

8 Claims. (Cl. 74—730)

The present invention relates to variable speed power transmissions and has particular reference to transmissions of the type comprising a hydraulic torque converter combined with gear mechanism providing for a plurality of driving combinations with different gear ratios in both forward and reverse drives. Power transmissions embodying the invention are particularly suitable for use in tractors and like vehicles which at low speeds require a considerable multiplication of the torque delivered by the engine and which also are desirably operated at higher speeds at certain times. For operation at such higher speeds the invention contemplates, in addition to the hydraulic drive, the provision of an alternative mechanical drive through the transmission.

The general object of the present invention is the provision of a new and improved mechanism of the kind described in which variable speed power transmission may be applied through a plurality of different gear ratios both in forward and reverse drive, with the minimum number of gears and clutches for the number of different ratios provided, and with the required parts so organized as to provide a relatively simple and compact structure.

The manner in which the above general object, and other more detailed objects hereinafter appearing, is attained, may best be understood from a consideration of the ensuing portion of this specification, taken in conjunction with the accompanying drawings forming a part hereof, which disclose by way of example, but without limitation, suitable embodiments of structure for carrying the invention into effect, the scope of the invention being defined by the appended claims.

In the drawings:

Fig. 2 is a schematic flow diagram showing the hydraulic valve and conduit system for controlling the clutches and brake of the transmission shown in Fig. 1 to secure desired direction and ratio of drive, as well as neutral;

Fig. 3 illustrates another embodiment of the invention, the mechanical gear and the reversing gear being shown in axial section; and Fig. 4 is a schematic flow diagram similar to Fig. 2 showing the hydraulic control system for the transmission illustrated in Fig. 3.

Figure 1:
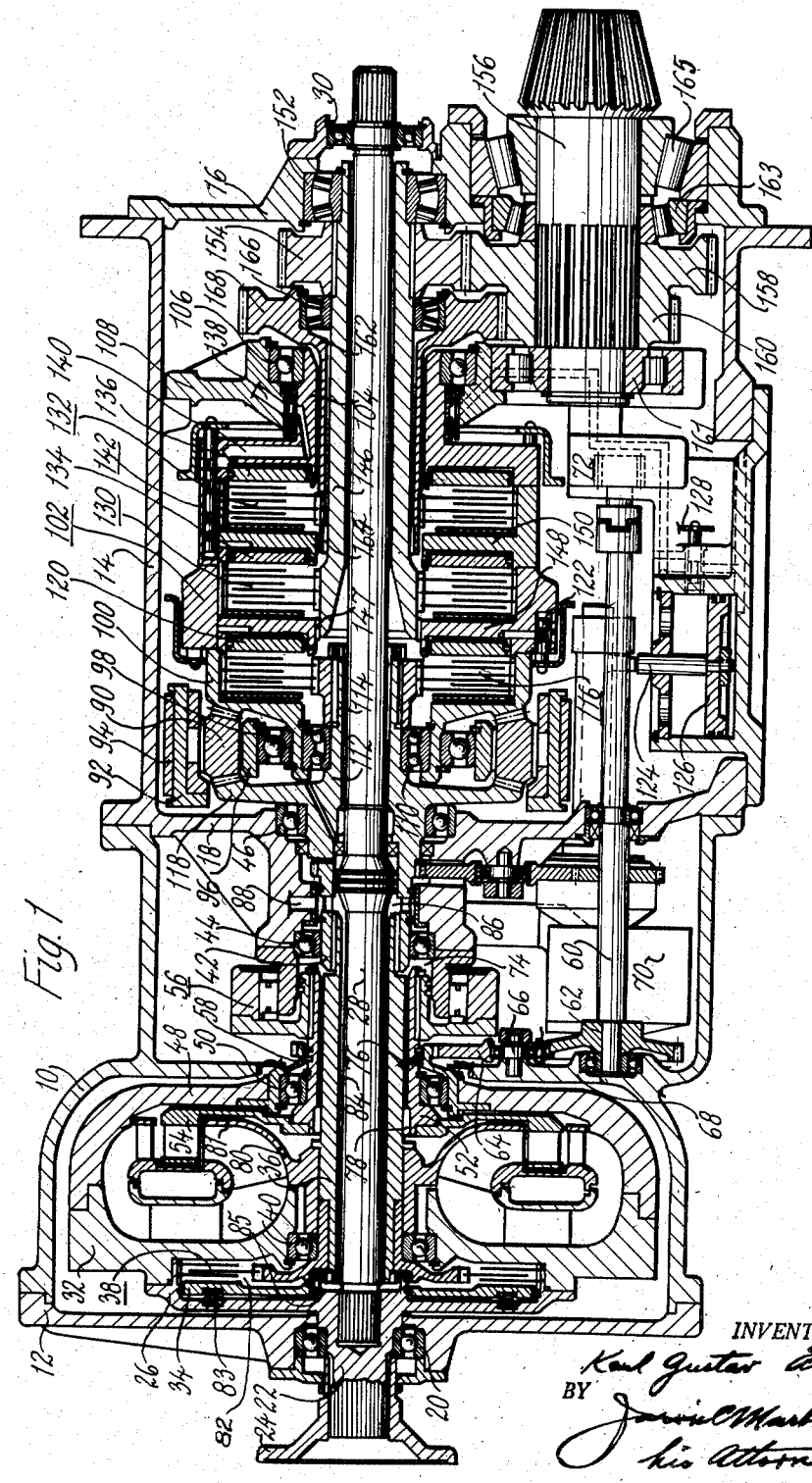
Fig. 1 is a central longitudinal section of one of the embodiments.

As shown in the drawings, the power transmission is provided with a stationary housing consisting of two interconnected main parts comprising a housing 10 for the hydraulic torque converter and a housing 14 for the reversing gear, the mechanical gear, and the clutches, which are located between these two last mentioned devices. The housing 10 is provided with an end wall 12. The housing 14 is also provided with an end wall 16 and further provided with a partition wall facing towards the hydraulic torque converter housing 10 in the form of an end wall 18. In the two embodiments of the invention illustrated, the hydraulic gear, the reversing gear, and the friction clutches are coaxially arranged.

In the forward end wall 12 of housing 10 a bearing 20 is provided which supports the primary shaft 22 of the transmission, which shaft is to be connected with an engine shaft by means of a flange 24. At its inner end the shaft 22 is provided with a disc like flange 26. Into this flange 26 a shaft 28 is inserted which at one end is connected by means of splines with the shaft 22, its opposite end being supported by a bearing 30 carried by the rear end wall 16. The shaft 28 projects outside this bearing and is provided with splines or the like for driving auxiliary apparatus by means of this shaft directly attached to the engine shaft.

The rotating casing member 32 carrying the pump blades of the hydraulic converter is connected to the flange 26, and a spring loaded annular clutch operating member 34 is located in a recess in the flange 26 and provided to connect the hollow turbine shaft 36 of the hydraulic torque converter with the pump housing member 32 by means of a friction clutch 38 having a driven disc connected to the turbine shaft 36 and located between the operating member 34 and the member 32. Shaft 36 is supported at one end by a bearing 40 located in the casing member 32 and at its opposite end is connected by means of splines with the front end of the reversing gear shaft 42, the latter at its place of connection with the turbine shaft 36 being supported by a bearing 44 mounted in the front portion of the end wall 18 and being further supported by a bearing 46 in the rear portion of the wall.

The casing member 32 is bolted together with another casing member 48 supported by a bearing 50. This bearing is mounted on a hollow shaft 52, to the front part of which the guide blade ring 54 of the hydraulic torque converter is fixed, the rear portion of said shaft being provided with a one-way or free wheel brake 56. The purpose of this arrangement is to lock the guide blade ring 54 against rotation in the direction opposite that of the pump during hydraulic drive, while during direct drive said ring is released to turn in the same direction as that of the pump.

A gear wheel 58 fixed to the casing member 48 meshes with a gear wheel 64, which is journalled on a pin 66 secured to an inwardly projecting flange 68 on the stationary housing 10. The gear wheel 64 in its turn drives through an intermediate wheel (not shown) a pump 70 for supplying pressure fluid for the hydraulic torque converter, and also a shaft 60 by means of a gear wheel 62. Shaft 60 at its rear end is connected to transmit power to a pump 72 for supplying pressure fluid to the hydraulic system controlling the friction clutches behind the reversing gear.

The pressure fluid discharged from the pump 70 may be conducted to two main places, one of which is the working chamber of the converter which chamber in its turn is in communication with the chamber behind the clutch operating member 34, and to the chamber in front of this member, i. e. between the same and the flange 26.

When pressure fluid is delivered to the working chamber of the converter the hydraulic drive 32, 54, 36 is engaged, the pressure fluid being delivered through the channel 74 to the channel 76 between the shaft 52 and the turbine shaft 36, and therefrom through a needle bearing 78 and an opening 80 in the turbine disc 81 into the working chamber of the hydraulic torque converter. This chamber is in communication with the chamber 82 behind the clutch operating member 34 through the ball bearing 40. Due to this pressure the spring loaded member 34 is forced away from the discs of clutch 38 so that this clutch is released when the hydraulic drive is operative.

For shifting to direct drive a low pressure relief valve, corresponding to valve 178 of my copending application Serial No. 100,041, hereinafter referred to, is opened by a main control valve such as valve 168 in my copending application aforesaid so that the pressure in the working chamber of the hydraulic torque converter decreases to about 0.4 kg./cm.$^2$ above atmospheric pressure and the hydraulic power transmission 32, 54, 36 is released, the clutch disc 34 at the same time being forced against the clutch 38 by springs 83 for engaging the turbine shaft 36, by means of which direct drive is engaged. For increasing the pressure of the operating member 34 against the clutch 38, pressure fluid is simultaneously delivered to the chamber between the flange 26 and the member 34 through a channel 85, which through the chamber 84 between the turbine shaft and the shaft 28, the chamber 86 and the channel 88 in the end wall 18, is in communication with the pump 70, the discharge of which also in this case is controlled by a main control valve such as valve 168 aforesaid. In both cases, in hydraulic as well as direct drive, the power transmission to the reversing gear is through the turbine shaft 36. While the specific control for determining hydraulic or direct drive forms per se no part of the present invention, the pressure fluid actuated system of the kind just briefly described may suitably be in accordance with the disclosure in my aforesaid application Serial No. 100,041 filed June 18, 1949, which embodies an automatic shift subject to a manually controlled overrule.

The reversing gear consists of a plurality of planet wheels 90 rotatably mounted between an inner ring 96 and an outer ring 92 which is to be braked by means of a brake band 94. The ring 96 is carried by a bearing 98 provided on the outside of the front part 100 of a rotating housing 102 enclosing the friction clutches, the rear end 104 of this housing being supported by a ball bearing 106 arranged in a partition wall 108 fixed to the housing 14. The front part 100 is supported by a ball bearing 110 mounted on the reversing gear shaft 112. On the rear end 114 of this shaft a friction clutch 116 is provided. The reversing gear shaft 112 is provided with a disc like bevel gear wheel 118 meshing with the planet wheels 90 on the one side of the reversing gear. On the other side the planet wheels mesh with teeth on the front wall 100 of the rotating housing 102. By means of the brake band 94 and the clutch 116, which is releasable and engageable by means of an annular piston 120, three engaging possibilities may be effected, forward, reverse and neutral. The clutch piston 120 is hydraulically controlled and the supply of pressure fluid from the pump 72 is controlled by a valve group 122. This may be set into two terminal positions, one for delivering pressure fluid to the clutch actuating piston 120 and one for conducting this fluid to the sump. The brake band 94 is hydraulically controlled by means of a piston rod 124, the piston 126 of which is actuated by the pressure fluid from the pump 72. The fluid connection to the piston is controlled by means of a valve group 128. This group 128 also may be set into two outer terminal positions, one for supplying the pressure from the pump and one for conducting this fluid to the sump. The valve groups 128 and 122 are interconnected by means of a link system in such a manner that when one group is set for supply, the other is automatically set for discharge to the sump and vice versa. This arrangement is shown in Fig. 2, from which it will be seen that when valve 122 is moved to its right terminal position, with resulting movement of valve 128 to its left terminal position, the vent from valve 122 is closed so that pressure fluid is applied to clutch piston 120 to engage clutch 116, while at the same time pressure fluid is cut off from brake actuating piston 126 the cylinder chamber for which is vented so that the brake is released. When the positions of the valves are reversed, pressure fluid is applied to piston 126 to effect engagement of the brake, while fluid is vented from piston 120 to release clutch 116. Between the terminal positions there is a middle position, (as shown in Fig. 2) in which the two valve groups cut off the delivery of pressure fluid to both the brake and the clutch piston and open them to communication with the sump.

When clutch 116 is engaged and brake band 94 is released, forward drive is provided. To provide a neutral position, the clutch 116 is also disengaged by setting the valve groups 122 and 128 in their middle positions.

Reverse drive is obtained by engaging the brake band 94 and releasing the clutch 116.

The torque transmitted through the reversing gear to the rotating clutch housing 102 may alternatively be transmitted by means of the friction clutches 130 and 132. These clutches, also, may be engaged by means of hydraulically controlled pistons 134 and 136, to which pressure fluid is delivered from the pump 72 through a channel 138 in the partition wall 108 over to channels 140 in the rear end wall of the rotating housing 102 and from these channels to valve group 142 and to the chamber behind one of the pistons 134 or 136, the discharge from the chamber behind the released piston being controlled by means of discharge valve group 144. As shown in Fig. 2, valve 142 is in neutral or center position in which pressure fluid from channel 138 is cut off from both of the clutch actuating pistons 134 and 136, so that both of the clutches 130 and 132 are disengaged and drive cannot be transmitted to the output shaft regardless of whether drive is being transmitted in either direction to the housing 102. If valve 142 is moved to the left from the position shown, pressure fluid will be admitted to the piston 134, the vent from the pressure chamber therefor being closed. At the same time pressure fluid will be cut off from piston 136, the pressure chamber therefor being vented. Thus, with valve 142 moved to the left, clutch 130 will be engaged and clutch 136 will be released so that drive to the output shaft will be effected by way of gears 154 and 158. If, on the other hand, valve 142 is moved to the right from the neutral position shown, pressure fluid will be admitted to piston 136 and the pressure chamber for piston 134 will be vented, so that clutch 132 will be engaged and clutch 130 released, drive to the output shaft being then by way of gears 168 and 160.

The clutch 130 is connected at its inner part with the front end of a hollow shaft 146, which at this end is supported by a needle bearing 147 provided in the front partition wall of the walls 148, 150 of the rotating housing. At its rear end shaft 146 is supported by a bearing 152 mounted in the rear end wall 16 and arranged to transmit torque to the output shaft 156 of the mechanical gear by means of a gear wheel 154 mounted on shaft 146. The shaft 156 is also provided with a gear wheel, which has two gears 158 and 160. The gear 158 meshes with the gear wheel 154 to provide a certain gear ratio between the output shaft 156 and the turbine shaft 36 of the hydraulic torque converter, the clutch 132 being released.

For changing this gear ratio the hollow shaft 146 is released and a shaft 162 connected with the clutch 132 is engaged, which shaft at its front end is journalled in a needle bearing 164 and at its rear end is supported by a roller bearing 166. The shaft 162 transmits the driving torque to a gear wheel 168 formed on the shaft. This gear wheel in its turn meshes with the gear 160. As will be evident from inspection of the relative diameters of gears 154 and 158, as compared with the relative diameters of gears 168 and 160, the former pair, when activated by engagement of clutch 130, provide a relatively low speed drive to the output shaft 156 as compared with the drive effected through the latter pair of gears upon engagement of clutch 132. Clutch 130 may therefore be considered the low speed clutch and clutch 132 the high speed clutch. The output shaft 156 is supported by roller bearings 161, 163, and 165 of which the bearing 161 is mounted in the partition wall 108 and the bearings 163 and 165 in the end wall 16.

The embodiment shown in Fig. 3 is a modification of that shown in Fig. 1. The rotating clutch housing 102 at its rear end 104 is provided with a gear wheel 170, which substantially corresponds to the gear wheel 154 in Fig. 1. The shaft 172 of the clutch 130 is provided at its rear end with a gear wheel 174, which meshes with a gear 176 on the output shaft. On this shaft, in front of the gear 176 there is provided a double acting free wheel 178 the roller cage 180 of which is automatically shiftable to either side, depending on whether forward or reverse drive is engaged. The outer ring 182 of the free wheel is provided with gear teeth meshing with the gear wheel 170. The shifting of the roller cage 180 is synchronized with the position of the brake band 94 by connecting the piston rod 124 with a sleeve 184 with grooves for one end of a lever 186 actuating at its opposite end a shaft 188, which is journalled in a projecting part 190 from the partition wall 108 to move axially in either direction. At the rear end of the shaft 188 there is mounted a cap 192, within which is provided a ball bearing 194 which is mounted with its inner ring on an axially slidable shaft 196, which by means of pins 198 is rotationally fixed. These pins run in grooves provided in a cylinder 200 mounted at the front end part of the output shaft 156, within which a shaft end 202 provided with threads is mounted, which threads mesh with corresponding threads in a shaft 199. On the shaft 199 is mounted a ring connected with the roller cage 180. When the shaft 188 is pushed inwardly or outwardly, these threads will cause the shaft 199 to turn itself and thereby to turn the roller cage 180 to either of its end positions depending on the direction of rotation. By means of this construction with a reversible free wheel, the clutch 132 shown in Fig. 1 is made unnecessary. In addition to eliminating one of the clutches required in the embodiment shown in Fig. 1, the present arrangement also enables a somewhat simplified and unitary valve control to be employed, as will be more clearly evident from the diagram shown in Fig. 4.

In the present embodiment the two clutches comprising the direct drive clutch 116 and what is in effect the low speed clutch 130 are controlled by a valve group of which one is shown at 204 in Fig. 4, the valve 204 being interconnected with valve 128 which controls the flow of operating fluid to and from the piston 126 for controlling the brake that works in alternation with the forward drive clutch 116.

As seen in Fig. 4 the valve 204 which constitutes the main control valve is located in mid or central position and as will be seen from the drawing the forward drive clutch 116 is vented through branch conduits b and e and the pressure chamber for the brake piston 126 is vented through conduits g and i, pressure fluid from the conduit h being cut off by valve 128. Thus a neutral position is established which breaks the drive line from the source of power to the rotating clutch casing 102. Additionally with the valve 204 in neutral position the low speed clutch 130 is released since the pressure chamber for piston 134 is vented through conduits a and f. If valve 204 is moved one step to the left from the position shown, vent conduit e will be cut off, pressure conduits d and b will be connected so that the clutch 116 will be engaged and forward drive will be imparted to the clutch casing 102. The chamber for the brake piston 126 remains vented. Also the pressure chamber for piston 134 remains vented, so that the drive to the output shaft is by way of gear 170 which gives to the output shaft the lower speed.

Movement of valve 204 to the left by an additional step does not affect the operation either of clutch 116 or the brake piston 126 so that forward drive of the clutch housing 102 continues. However, the additional movement closes the vent conduit f and connects pressure conduits c and a so that clutch 130 is engaged. High speed forward drive is then effected through gears 174 and 176. This is made possible in spite of the continuing rotation of gear 170 by the provision of the overrunning clutch or free wheel 178.

If valve 204 is moved from neutral position one step to the right, pressure fluid remains cut off from clutch 116 while the vent conduit i from 126 is closed. Pressure conduits h and g are connected to cause actuation of piston 126 and engagement of the brake 94. Reverse drive is thus imparted to the rotating clutch casing 102. In this position of the valve, pressure fluid remains cut off from the clutch piston 134 so that clutch 130 remains disengaged and drive to the output shaft is by way of the low speed gear 170. Movement to the right an additional step leaves the piston of clutch 116 still cut off from pressure fluid and also leaves piston 126 still exposed to pressure fluid. Thus reverse drive of the clutch casing 102 is not disturbed. The final movement to the right, however, places conduits c and a in communication to effect engagement of clutch 130 by applying pressure to piston 134. The result is reverse drive at high speed ratio through gear 174, this again being permitted by virtue of the free wheel arrangement 178 which as previously noted is reversible in synchronized relation with the actuation of piston 126. While this has not been indicated in Fig. 4, the mechanism is clearly shown and has been described in detail in connection with Fig. 3. In order to make Fig. 4 more readily readable, there has been included as a part thereof a chart showing the presence or absence of pressure in the various conduits of the system as heretofore described.

It will be apparent that various changes may be made in the design of the structure hereinabove described by way of example, and that if desired certain features may be employed to the exclusion of others, without departing from the spirit or scope of the invention, which is to be understood as embracing all forms of apparatus falling within the terms of the appended claims.

I claim:

1. A power transmission for transmitting power from an input shaft to an output shaft comprising a hydrodynamic torque converter, a multiple ratio speed-change gear interposed in the line of power transmission between said converter and said output shaft, a reversing gear interposed in the line of power transmission between said converter and said speed-change gear and a control for said reversing gear, said speed-change gear including a rotatably mounted carrier member carrying a plurality of selectively operable clutches and hydraulically actuated pressure responsive means for actuating said clutches, said converter, said reversing gear and said carrier member being coaxially mounted for rotation about a common axis and a hydraulic control system including valve means carried by said carrier member for controlling said clutches to selectively provide drive of said output shaft in either direction at desired change-speed ratios.

2. A transmission as defined in claim 1 in which said output shaft is mounted to rotate about an axis laterally of said common axis and in which said change-speed gear includes transfer gears in the line of power transmission between said clutches and said output shaft.

3. A transmission as defined in claim 1 including a reversing gear of the planet type having a carrier, a brake for holding said carrier against rotation to provide reverse drive to the carrier member of the change-speed gear and hydraulically actuated pressure responsive means for controlling said brake.

4. A transmission as defined in claim 3 in which the converter includes a turbine providing a driven member, said driven member including a gear part engaging the planets of the reverse gear and a part releasably connected by one of said clutches to the carrier member of the change-speed gear and fluid actuated valve means for controlling engagement of the reverse brake and said one of said clutches to effect engagement thereof in alternation to secure either forward or reverse drive to the carrier member of the change-speed gear.

5. A transmission as defined in claim 4 including a fluid pressure actuated clutch for providing a mechanical drive to said driven member of the torque converter from said input shaft.

6. A transmission as defined in claim 1 in which said change-speed gear includes at least two clutches having driving parts carried by said carrier member, driven parts, and transfer gears on the respective driven parts for transmitting drive at different ratios respectively to said output shaft.

7. A transmission as defined in claim 1 in which the carrier member of the change-speed gear has fixed thereto a transfer gear for transmitting power at a first ratio from the carrier member to the output shaft and also carries the driving part of a clutch the driven part of which includes a transfer gear for transmitting power at a different ratio from the carrier member to said output shaft, a reversible one-way clutch in the line of power transmission from one of said transfer gears to said output shaft, means for selectively controlling said reverse gear, means for selectively controlling the direction of drive through said reversible free wheel clutch, and means interconnecting said controlling means for setting the freewheel clutch to drive in the appropriate direction corresponding to the direction of drive determined by the setting of the means for controlling the reversing gear.

8. A power transmission as defined in claim 1 in which the valve means of said hydraulic control system includes a valve movable to admit pressure fluid to the pressure responsive means for engaging one of the clutches of the speed-change gear and another valve movable in response to the creation of pressure in said pressure responsive means to vent the pressure responsive means of another of the clutches of said change-speed gear.

References Cited in the file of this patent

UNITED STATES PATENTS

| Number | Name | Date |
| --- | --- | --- |
| 2,102,634 | Lysholm | Dec. 21, 1937 |
| 2,168,862 | De Lavaud | Aug. 8, 1939 |
| 2,371,828 | Kuhns et al. | Mar. 20, 1945 |
| 2,373,122 | La Brie | Apr. 10, 1945 |
| 2,433,052 | Kelley | Dec. 23, 1947 |
| 2,511,039 | Black et al. | June 13, 1950 |
| 2,536,737 | Gerst | Jan. 2, 1951 |
| 2,547,236 | Swenson | Apr. 3, 1951 |

FOREIGN PATENTS

| Number | Country | Date |
| --- | --- | --- |
| 263,746 | Switzerland | Dec. 1, 1949 |
| 896,879 | France | Mar. 6, 1945 |
| 60,067 | Netherlands | Oct. 15, 1947 |